(12) United States Patent
Tanaka

(10) Patent No.: US 8,638,694 B2
(45) Date of Patent: Jan. 28, 2014

(54) NETWORK EXPLORATION METHOD AND NETWORK EXPLORATION APPARATUS

(75) Inventor: Ryuta Tanaka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 173 days.

(21) Appl. No.: 13/181,858

(22) Filed: Jul. 13, 2011

(65) Prior Publication Data

US 2012/0057504 A1 Mar. 8, 2012

(30) Foreign Application Priority Data

Sep. 6, 2010 (JP) ................................ 2010-199309

(51) Int. Cl.
*H04L 12/28* (2006.01)
(52) U.S. Cl.
USPC ............................ 370/255; 370/254; 370/256
(58) Field of Classification Search
USPC ......................................... 370/254, 255, 256
See application file for complete search history.

(56) References Cited

U.S. PATENT DOCUMENTS

| | | | | |
|---|---|---|---|---|
| 6,397,362 B1 * | 5/2002 | Ishiyama | ...................... | 714/724 |
| 7,016,313 B1 * | 3/2006 | Harper | .......................... | 370/254 |
| 2002/0163686 A1 * | 11/2002 | Bischoff et al. | ............... | 359/110 |
| 2005/0286426 A1 * | 12/2005 | Padhye et al. | .................. | 370/238 |
| 2006/0109859 A1 * | 5/2006 | Acharya et al. | ................ | 370/445 |
| 2007/0081460 A1 * | 4/2007 | Karacali-Akyamac et al. | ............................. | 370/230 |
| 2009/0122720 A1 * | 5/2009 | Karacali-Akyamac et al. | ............................. | 370/254 |
| 2009/0164657 A1 * | 6/2009 | Li et al. | ......................... | 709/233 |
| 2009/0238075 A1 * | 9/2009 | Mosko | ........................... | 370/238 |

FOREIGN PATENT DOCUMENTS

| | | |
|---|---|---|
| JP | 2000-172600 | 6/2000 |
| JP | 2006-345347 | 12/2006 |

* cited by examiner

*Primary Examiner* — Hassan Phillips
*Assistant Examiner* — Siren Wei
(74) *Attorney, Agent, or Firm* — Staas & Halsey LLP

(57) ABSTRACT

A network exploration apparatus is configured to calculate a communication cost of a network to which a plurality of terminals is coupled through a plurality of network devices. The network exploration apparatus includes a transmitter configured to transmit an exploration packet to the plurality of terminals, a receiver configured to receive a response packet for the exploration packet, a detector configured to detect a terminal group to which a terminal that does not receive the exploration packet among the plurality of terminals belongs based on a reception result of the response packet by the receiver, and a calculator configured to calculate a communication cost between terminals based on an inclusion relationship between a plurality of terminal groups detected by the detector when the transmitter repeatedly transmits the exploration packet.

9 Claims, 16 Drawing Sheets

FIG. 5A

| IP HEADER | UDP HEADER | ID | EXPLORATION NO. | RETURN ADDRESS RETURN PORT |

FIG. 5B

| IP HEADER | UDP HEADER | ID | EXPLORATION NO. |

FIG. 6A

| EXPLORATION NO. | TERMINALS THAT RECEIVE RESPONSES |
|---|---|
| 100 | N3, N4, N5, N6 |

FIG. 6B

| TERMINAL LIST | N1, N2, N3, N4, N5, N6 |
|---|---|

FIG. 8

| RANK | GROUP | FREQUENCY COUNTER |
|---|---|---|
| 1 | N1, N2 | 15 |
| 2 | N4, N5, N6 | 12 |
| 3 | N1, N2, N3 | 10 |
| 4 | N5, N6 | 8 |
| 5 | N1, N2, N3, N4, N5, N6 | 5 |
| 6 | N1, N2, N5, N6 | 1 |

FIG. 13

| TERMINAL | COMMUNICATION COST FROM N6 |
|---|---|
| N1 | 4 |
| N2 | 4 |
| N3 | 3 |
| N4 | 1 |
| N5 | 0 |

FIG. 15

| TERMINAL | COMMUNICATION COST FROM N1 |
|---|---|
| N2 | 0 |
| N3 | 1 |
| N4 | 3 |
| N5 | 4 |
| N6 | 4 |

NETWORK EXPLORATION METHOD AND NETWORK EXPLORATION APPARATUS

CROSS-REFERENCE TO RELATED APPLICATIONS

This application is based upon and claims the benefit of priority of the prior Japanese Patent Application No. 2010-199309, filed on Sep. 6, 2010, the entire contents of which are incorporated herein by reference.

FIELD

The embodiments discussed herein are related to a network exploration method and a network exploration apparatus to explore a network to which a plurality of terminals is connected.

BACKGROUND

A load to a distribution server in a client-server data distribution system increases as the number of data reception terminals increases. Thus, in a large-scale distribution system, a capacity of a distribution server where accesses are concentrated on or a capacity of the network infrastructure needs to be increased. As a result, the distribution cost increases. Under the background, recently, a data distribution method that applies a peer-to-peer (P2P) technique has drawn attention.

In a streaming distribution method that utilizes P2P, for example, a terminal that receives data transfers the data to another terminal. In this case, respective terminals function as relay devices and thereby achieve large-scale broadcast. According to the method, even if the number of terminals increases, a load on a distribution server will not increase much.

The P2P data distribution may be regarded as data distribution over a logical network (or an overlay network) configured by logical links among terminals without a need to be conscious of the physical network environment. Moreover, in the P2P data distribution, an amount of data traffic that flows over the physical network is determined by a method of coupling terminals over the logical network.

FIG. 1 illustrates P2P data distribution. In the network of FIG. 1, three terminals, n1 to n3 are coupled through routers, A to D. In the network, data are assumed to be distributed from the terminal n1 to the terminal n2 and the terminal n3 by the P2P method. In this case, data distribution from the terminal n1 to the terminal n2 and the terminal n3 is achieved, for example, by the following procedure A or procedure B. In procedure A, the terminal n1 transmits data to the terminal n2, and the terminal n2 transfers the data to the terminal n3. In procedure B, the terminal n1 transmits data to the terminal n3 and the terminal n3 transfers the data to the terminal n2.

An appropriate selection of a procedure with a shorter network distance of data distribution increases efficiency of data distribution. The network distance is represented, for example, by the number of routers over the communication route. For example, in a procedure 1, three routers, C, B, and A are present over a route from the terminal n1 to the terminal n2 while two routers A and D are present over a route from the terminal n2 to the terminal n3. In other words, the total network distance of the procedure 1 is "5." Meanwhile, in a procedure 2, four routers, C, B, A, and D are present over a route from the terminal n1 to the terminal n3 while two routers D and A are present over a route from the terminal n3 to the terminal n2. In other words, the total network distance of the procedure 2 is "6." In this case, selecting procedure 1 instead of procedure 2 increases efficiency of the data distribution. Note that the number of routers over a communication route may be detected, for example, by a traceroute command or a tracert command.

FIG. 2 illustrates an example of a subnetwork that includes a plurality of switching hubs. In the example of FIG. 2, the subnetwork includes five switching hubs, SW1 to SW5 and configured under a control of a router. The terminals N1 to N6 may transmit and receive data through the switching hubs SW1 to SW5.

In the example below, operations will be described under an assumption that a network topology (a network distance) may be identified in the same manner as the network configured by routers in FIG. 1 may be identified.

In the example, data are assumed to be transmitted from the terminal N1 to terminals, N2 to N6 by the P2P method. In this case, the terminal N1 transmits data to a destination terminal with substantially the shortest network distance. In the configuration illustrated in FIG. 2, the terminal N1 transmits data to the terminal N2. The terminal N2 transfers the received data to another destination terminal with substantially the shortest network distance. In the configuration illustrated in FIG. 2, terminal N2 transfers the data to the terminal N3. Thereafter, each terminal transfers the received data to another terminal based on the network distance. Accordingly, efficient data distribution from the terminal N1 to terminals, N2 to N6 may be achieved.

As a related technology, Japanese Laid-open Patent Publication No. 2000-172600 discusses a network configuration exploration method that is capable of identifying devices to be managed that are connected to a network using different protocols. In the network configuration exploration method, types of protocols that can be used are obtained and exploration requests are transmitted that request devices coupled using all types of protocols to respond. Then responses from the devices are calculated and a device list used for managing the devices is displayed based on the calculated result.

As another related technology, Japanese Laid-open Patent Publication No. 2006-345347 discusses a communication apparatus that performs configuration exploration of a customer premises network. The communication apparatus includes an exploration packet generation unit, a received packet analysis unit, a control unit, and a packet transmission and reception unit. The exploration packet generation unit generates a router exploration packet in which time to live (TTL) is changed and switches a transmission destination of the router exploration packet. The received packet analysis unit obtains an address of the router from an Internet Control Message Protocol (ICMP) packet that is returned from the router in response to the router exploration packet. The control unit obtains information from the received packet analysis unit, controls the router exploration packet generation unit, and conducts the network exploration. The packet transmission and reception unit transmits and receives the router exploration packet and the ICMP packet.

SUMMARY

A network exploration apparatus is configured to calculate a communication cost of a network to which a plurality of terminals is coupled through a plurality of network devices, the network exploration apparatus including: a transmitter configured to transmit an exploration packet to the plurality of terminals; a receiver configured to receive a response packet for the exploration packet; a detector configured to detect a terminal group to which a terminal that does not receive the exploration packet among the plurality of terminals belongs based on a reception result of the response packet by the receiver; and a calculator configured to calculate a communication cost between terminals based on an inclusion relationship between a plurality of terminal groups detected by the detector when the transmitter repeatedly transmits the exploration packet.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

These and/or other aspects and advantages will become apparent and more readily appreciated from the following description of the embodiments, taken in conjunction with the accompanying drawings of which:

FIG. 5A is an embodiment of an exploration packet;

FIG. 5B is an embodiment of a response packet;

FIG. 6A is an embodiment of a temporary list;

FIG. 6B is an embodiment of a terminal list;

FIG. 8 is an embodiment of a group information list;

FIG. 13 is an embodiment of a communication cost table;

FIG. 15 is an embodiment of a communication cost table created by another embodiment.

DESCRIPTION OF EMBODIMENTS

Figure 1:
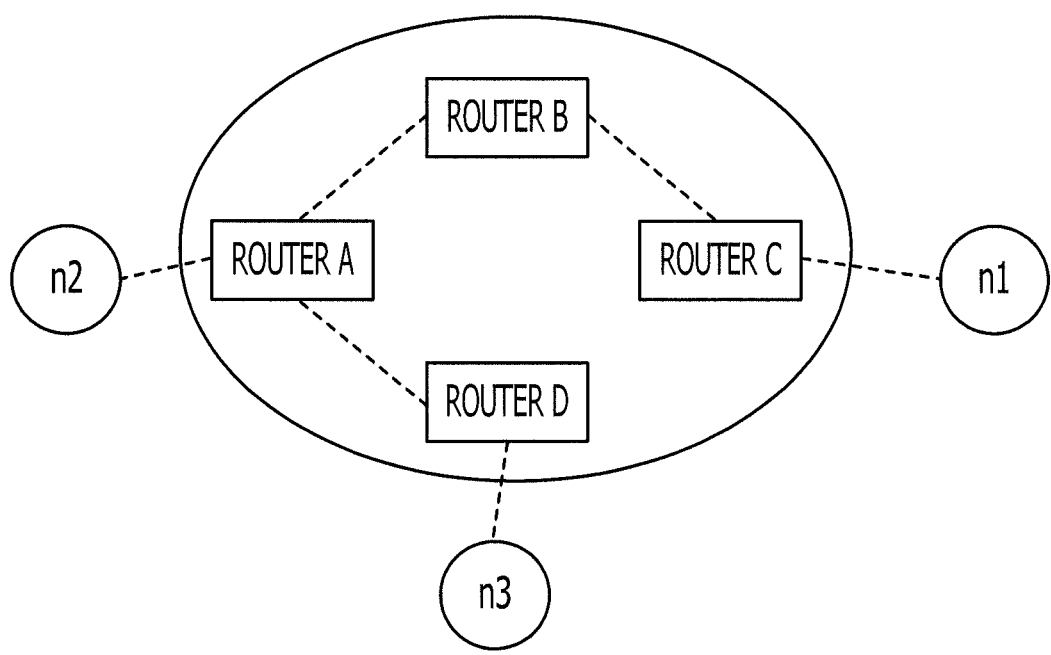
FIG. 1 illustrates P2P data distribution.
Figure 2:
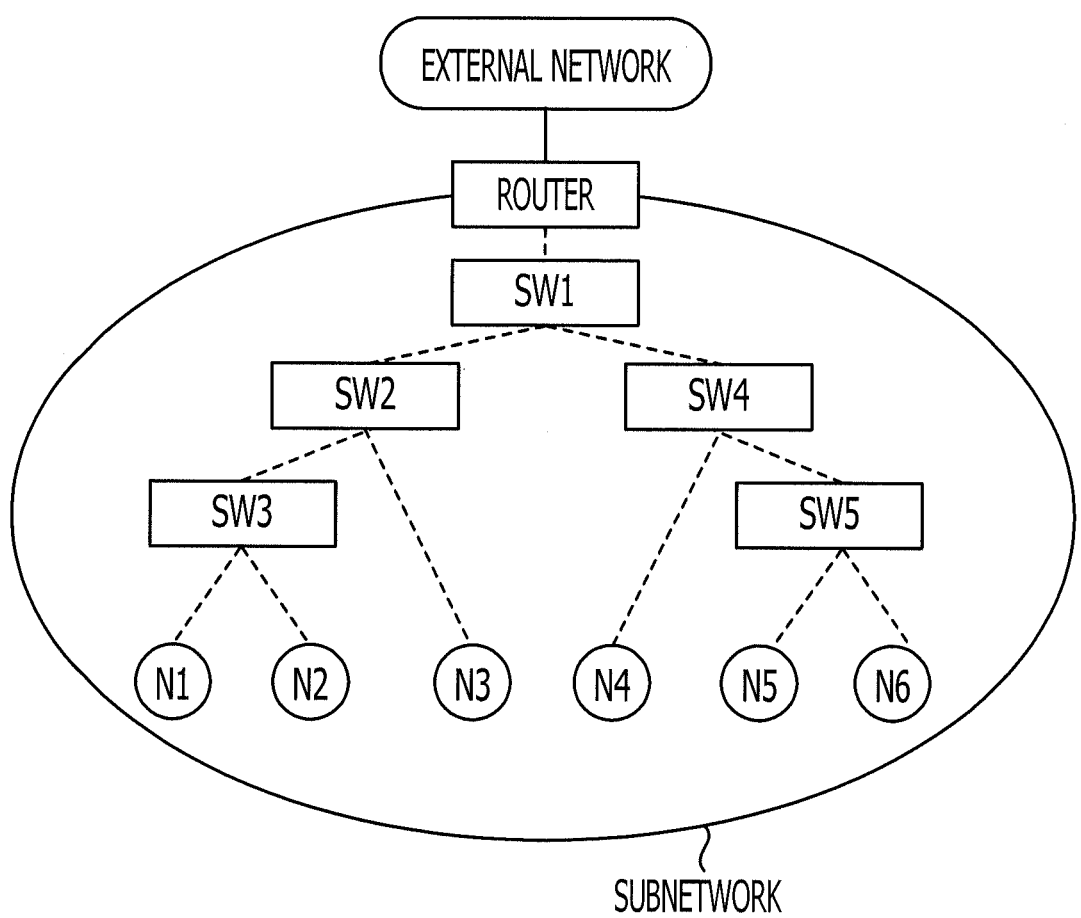
FIG. 2 illustrates an example of a subnetwork that includes a plurality of switching hubs.

Reference may now be made in detail to embodiments of the present invention, examples of which are illustrated in the accompanying drawings, wherein like reference numerals refer to like elements throughout.

As described above, when data are distributed to a plurality of terminals by the P2P method, each terminal transfers data to a destination terminal with a shorter network distance, and thereby efficient data distribution may be achieved. However, data may not be distributed efficiently when a network is configured by a Layer 2 (L2) switch (or a switching hub) due to the following reasons. Note that "L2" indicates the layer 2 of the Open Systems Interconnection (OSI) reference model.

The L2 switch transfers the data based on destination information of the data, however the L2 switch may not process a command (for example, a trace route command) of an IP layer or a higher layer. Hence, in a network configured with an L2 switch, communication terminals (for example, terminals, L2 switches, and a network management device) may not detect an L2 switch from the IP layer or a higher layer, and thereby the number of L2 switches over a communication route may not be measured. In other words, measuring a network distance between terminals is difficult. As a result, each terminal may not appropriately select a destination terminal with a shorter network distance in the network and data are inefficiently distributed.

The present disclosure achieves a mechanism capable of estimating a communication cost in order to improve communication efficiency among terminals in a network to which a plurality of terminals is coupled.

Hereinafter, embodiments will be described by referring to accompanying drawings.

Figure 3:
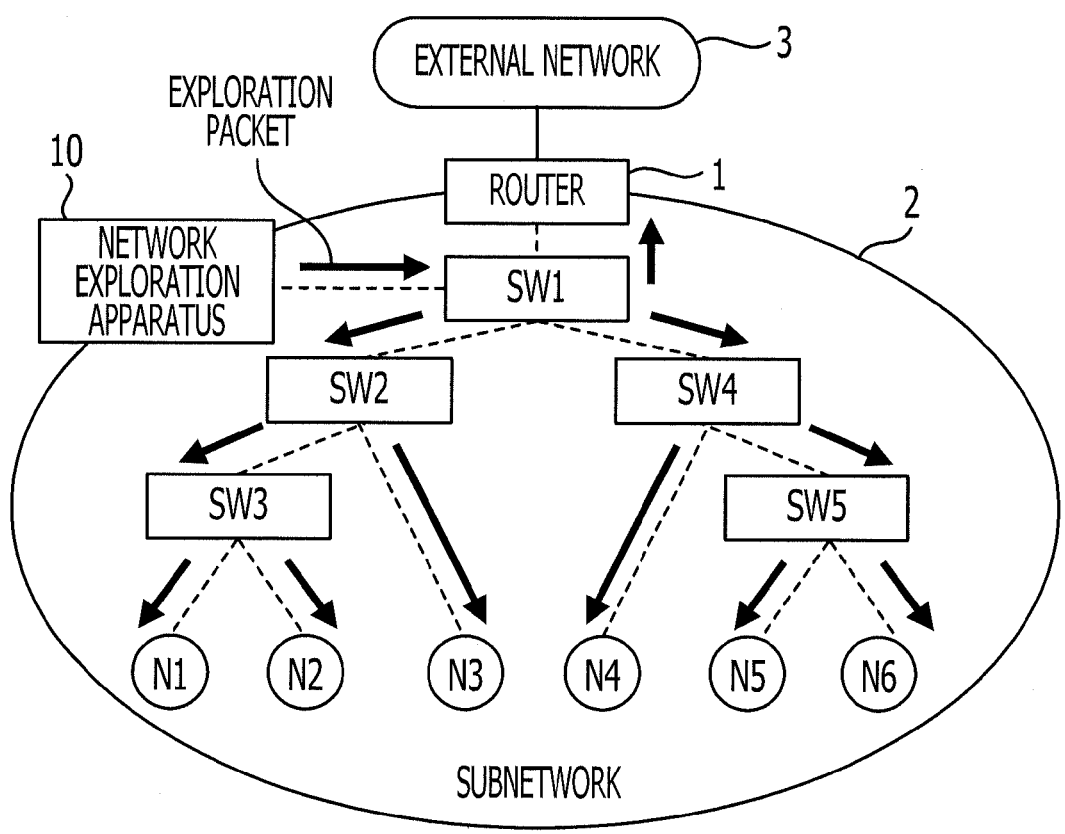
FIG. 3 illustrates a configuration example of a network in which a network exploration method according to an embodiment is used.

FIG. 3 illustrates a configuration example of a network in which a network exploration method according to an embodiment is used. In the example, a network exploration method according to the embodiment is used in a subnetwork 2 that is coupled to a router 1. The router 1 couples an external network 3 with the subnetwork 2. Furthermore, the router 1 in the example provides functions of the layer 3 or higher of the OSI reference model, and for example, provides a function to respond to a trace route command, etc.

The subnetwork 2 is configured with a plurality of network devices (according to the embodiment, switching hubs SW1 to SW5). The switching hub SW1 is coupled to the router 1. The switching hub SW2 and the switching hub SW4 are coupled to the switching hub SW1. Moreover, the switching hub SW3 is coupled to the switching hub SW2 and the switching hub SW5 is coupled to the switching hub SW4. The switching hubs SW1 to SW5 are, for example, L2 switches. In other words, it is assumed that the switching hubs SW1 to SW5 in this example may not execute an IP command and a protocol command of the layer 3 or higher.

Six terminals N1 to N6 are coupled to the subnetwork 2. The terminal N1 and the terminal N2 are accommodated in the switching hub SW3. The terminal N3 is accommodated in the switching hub SW2. The terminal N4 is accommodated in the switching hub SW4. The terminal N5 and the terminal N6 are accommodated in the switching hub SW5.

Each of the terminals N1 to N6 has a function to transmit and receive data to and from another terminal by peer-to-peer (P2P). Destination information to achieve broadcast by P2P is set in each of the terminals N1 to N6. For example, destination information of N1, N2, N3, N4, N5, and N6 other than that of own terminal is set in the terminals N1, N2, N3, N4, N5, and N6 respectively. In this case, the router 1 transfers broadcast data addressed to the terminal N1 that is received from the external network 3 to the terminal N1 by way of the SW1, SW2, and SW3.

The terminal N1 refers to destination information and transfers the broadcast data received from the external network 3 to the terminal N2 via the SW3. The terminal N2 refers to the destination information and transfers the broadcast data received from the terminal N1 to the terminal N3 by way of SW3 and SW2. Likewise, the terminals N3, N4, and N5 transfer the broadcast data to the terminals N4, N5, and N6 respectively via SWs according to the destination information. Accordingly, the terminals N1 to N6 receive the broadcast data. The terminal N6 may further transfer the received broadcast data to other terminal in another subnetwork.

A network exploration apparatus 10 is a server computer, detects a topology of the subnetwork 2, and calculates communication costs among the terminals N1 to N6. Although details of the communication cost will be described later, for example, the communication cost corresponds to the number of switching hubs that are present over a communication route among terminals. Furthermore, a network exploration apparatus 10 may generate the above-described destination information based on communication costs among the terminals N1 to N6. In this case, the destination information is determined so as to substantially optimize communication efficiency of the above-described broadcast distribution. The network exploration apparatus 10 may distribute destination information to the terminals N1 to N6. Alternatively, the terminals N1 to N6 may request corresponding destination information to the network exploration apparatus 10.

In the example of FIG. 3, the network exploration apparatus 10 is coupled to the switching hub SW1. However, the network exploration apparatus 10 may be coupled to any of the switching hubs SW2 to SW5. Moreover, the network exploration apparatus 10 may be coupled to the router 1 or may be provided over the external network 3.

Figure 4:
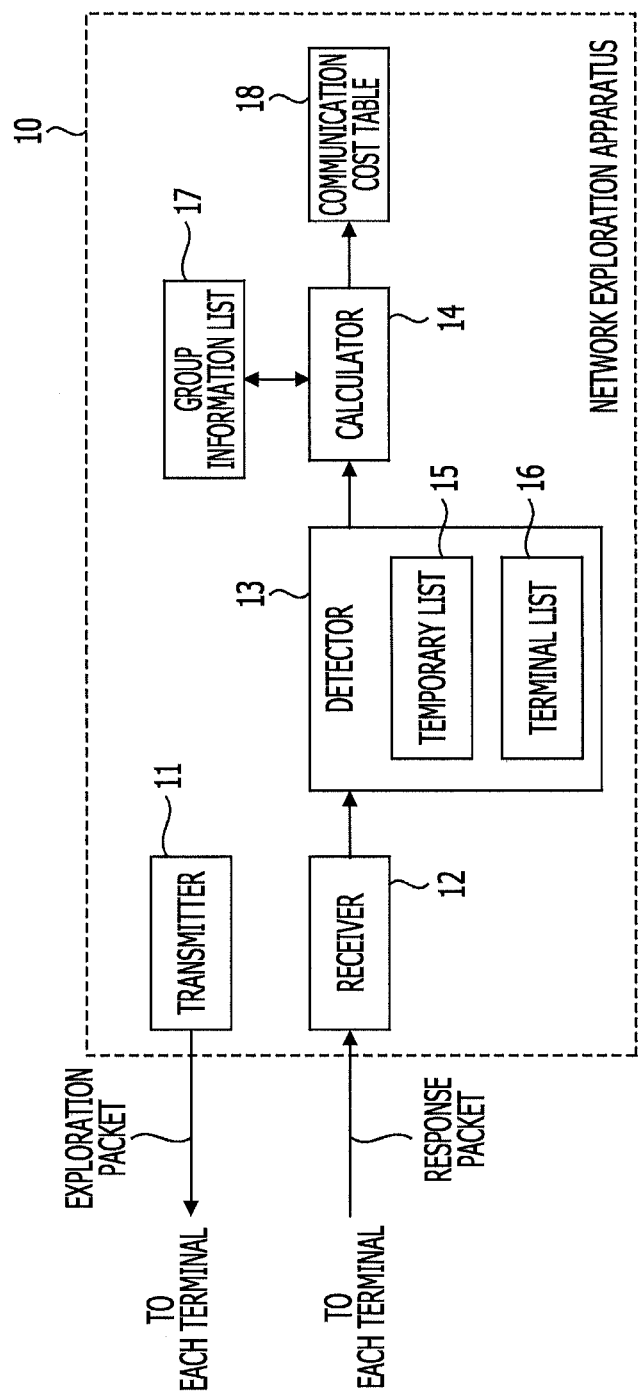
FIG. 4 illustrates a configuration of a network exploration apparatus.

FIG. 4 illustrates a configuration of the network exploration apparatus 10. The network exploration apparatus 10 according to the embodiment includes a transmitter 11, a receiver 12, a detector 13, and a calculator 14.

The transmitter 11 transmits exploration packets to all terminals coupled to a network to be explored. In the example of FIG. 3, the transmitter 11 transmits exploration packets to each of the terminals N1 to N6 that are coupled to the subnetwork 2.

The transmitter 11 transmits exploration packets by IP multicast or broadcast, although the embodiment is not limited to this. For example, when IP multicast is executed, an IP multicast address (for example, "224.0.0.1") is set in the IP header and the terminals N1 to N6 are set so as to receive exploration packets of the IP multicast address. In this case, the switching hubs SW1 to SW5 in FIG. 3 transfer exploration packets transmitted from the network exploration apparatus 10 to the terminals N1 to N6 according to the multicast address.

At this time, exploration packets transmitted from the network exploration apparatus 10 are transferred to the router 1 as well. The router 1 is set so as not to transmit the received exploration packets to an external network 2, although the embodiment is not limited to this. Alternatively, there is no terminal to receive the above-described multicast address at the external network 2 and the received exploration packets are not transmitted to the external network 2.

The transmitter 11 transmits an exploration packet by a protocol without a retransmission function, although the embodiment is not limited to this. In other words, the transmitter 11 transmits an exploration packet, for example, by User Datagram Protocol (UDP).

As illustrated in FIG. 5A, an ID, an exploration number, a return address, and a return port are set in an exploration packet. The ID indicates a packet type. Thus, a certain value indicating an exploration packet is set in an ID field of an exploration packet. The exploration number corresponds to a sequence number to identify each transmission procedure when the network exploration apparatus 10 repeats procedure to transmit exploration packets to the terminals N1 to N6. Accordingly, the same exploration number is assigned to each exploration packet transmitted to the terminals N1 to N6 by multicast or broadcast at one time.

The return address and the return port represent an address indicating destination to which the terminal that receives the exploration packet returns a response packet and the TCP/IP port number respectively. According to the embodiment, an IP address of the network exploration apparatus 10 is set in the return address. A reserved port number to receive a response packet at the network exploration apparatus 10 is set in the return port.

When each of the terminals N1 to N6 receives the above-described exploration packet, creates a response packet illustrated in FIG. 5B and returns the response packet to the network exploration apparatus 10. At this time, each of the terminals N1 to N6 transmits a response packet by a protocol with a retransmission function, although the embodiment is not limited to this. In other words, each of the terminals N1 to N6 transmits a response packet, for example, by Transmission Control Protocol (TCP).

The "return address" notified by an exploration packet is set in the destination IP address of the IP header of the response packet. In other words, the destination IP address of the response packet is an IP address of the network exploration apparatus 10. The "return port" that is notified by an exploration packet is set in the destination port number of the TCP header of the response packet. Moreover, a certain value that indicates the response packet is set in the ID field of the response packet. An exploration number of the received exploration packet is used as it is for the exploration number set in the response packet.

When each of the terminals N1 to N6 receives the exploration packet, transmits the above-described response packet to the network exploration apparatus 10. The switching hubs SW1 to SW5 transfer the response packets transmitted from the terminals N1 to N6 to the network exploration apparatus 10. At this time, the response packet includes information to identify a transmission source terminal of the response packet. The information to identify a transmission source terminal is, for example, a transmission source IP address set in an IP header. Accordingly, the network exploration apparatus 10 may detect the transmission source terminal of the response packet.

The receiver 12 receives a response packet for the exploration packet transmitted from the transmitter 11. According to the embodiment, the receiver 12 waits for response packets to be transmitted from the terminals N1 to N6 at a TCP port indicated by the above-described "return port." The receiver 12 passes the response packets received from the terminals N1 to N6 to the detector 13. Note that the receiver 12 waits for response packets for the exploration packet typically for a time period until a certain time ΔT elapses from when the transmitter 11 transmits the exploration packets.

For example, when the transmitter 11 transmits an exploration packet in which an exploration number 001 is set at time T1, the receiver 12 waits for a response packet to which the exploration number 001 is set until time T1+ΔT. Subsequently, when the transmitter 11 transmits an exploration packet to which an exploration number 002 is set at time T2, the receiver 12 waits for the response packet in which the exploration number 002 is set until time T2+ΔT.

The exploration number set in the exploration packet and transmission time of the exploration packet are notified, for example, from the transmitter 11 to the receiver 12. Alternatively, the detector 13 may manage exploration numbers. In this case, the exploration number is notified from the detector 13 to the transmitter 11 and the receiver 12.

The detector 13 detects a terminal group to which a terminal that does not receive the exploration packet belongs among all of the terminals coupled to the network to be explored based on the reception result of the exploration packet by the receiver 12. In other words, the detector 13 detects a terminal group to which a terminal that does not receive the exploration packet belongs among the terminals N1 to N6. The detector 13 detects the terminal group by using the temporary list 15 and the terminal list 16. The temporary list 15 and the terminal list 16 may be provided in the detector 13 or outside of the detector 13. The detector 13 detects a terminal group for each exploration number (in other words, whenever exploration packets are transmitted to the terminals N1 to N6 by multicast or broadcast).

FIG. 6A is an embodiment of the temporary list 15. A transmission source terminal of a response packet is registered in the temporary list 15 for each exploration number. In other words, the detector 13 checks an exploration number and a transmission source terminal of a response packet received by the receiver 12. The transmission source terminal of the response packet is identified, for example, by a transmission source IP address set in the IP header.

The detector 13 registers a transmission source terminal of a received response packet in the temporary list 15 whenever the receiver 12 receives a response packet. The example of FIG. 6A illustrates a state of the temporary list 15 when the transmitter 11 transmits exploration packets with an exploration number 100 to the terminals N1 to N6 and the receiver 12 receives response packets for the exploration packets from the terminals N3, N4, N5, and N6.

FIG. 6B is an embodiment of the terminal list 16. Terminals coupled to a network to be explored are registered in the terminal list 16. According to the embodiment, the terminals N1, N2, N3, N4, N5, and N6 that are coupled to the subnetwork 2 are registered in the terminal list 16. When terminals that are coupled to a network to be explored are known, the terminal list 16 is prepared beforehand. On the other hand, terminals to be coupled to a network to be explored are unknown, the terminal list 16 is created, for example, by the following procedure A:

(a1) transmit an exploration packet by multicast or broadcast.

(a2) register a transmission source terminal of a response packet for the exploration packet transmitted at (a1).

(a3) compare the temporary list 15 with the terminal list 16, and if there is a terminal listed only in the temporary list, add the terminal to the terminal list 16.

(a4) reset the temporary list 15.

(a5) repeat the above described (a1) to (a4) for the certain number of times.

The detector 13 may detect a terminal group while creating the terminal list 16 at the above procedure (a1) to (a5). Alternatively, the detector 13 may detect a terminal group after creating the terminal list 16 at the procedure (a1) to (a5).

The detector 13 detects a terminal group by the following procedure B:

(b1) instruct the transmitter 11 to transmit an exploration packet. Accordingly, the transmitter 11 transmits exploration packets to the terminals N1 to N6 by multicast or broadcast. At this time, the exploration packets are transmitted basically to all terminals registered in the terminal list 16.

(b2) register transmission source terminals of response packets (in other words, a response packet with an exploration number "i") corresponding to the exploration packets transmitted at (b1) in the temporary list 15.

(b3) refer to the temporary list 15 and the terminal list 16 and detect a terminal that is registered in the terminal list 16 but not registered in the temporary list 15. The detected one or more terminals are "a terminal other than the transmission source terminal of the response packet"

(b4) output a terminal group elements of which are the one or more terminals detected at (b3) as a terminal group obtained for an exploration number "i."

(b5) reset the temporary list 15.

As described above, the detector 13 detects the terminal group elements of which are "a terminal other than the transmission source terminal of the response packet" for the exploration number "i." In the example of FIG. 6, the terminals N1 to N6 are registered in the terminal list 16, and the terminals N3 to N6 are registered in the temporary list 15 for the exploration number 100. In other words, the terminals N1 and N2 are registered in the terminal list 16 but not registered in the temporary list 15. In this case, the detector 13 outputs "terminal group=N1, N2" for the exploration number 100.

The detector 13 repeats the above-described procedure (b1) to (b5) while counting up the exploration number "i." Note that when all terminals registered in the temporary list 15 match all terminals registered in the terminal list 16, no terminal group is detected. In other words, "terminal group=not available" is output.

FIG. 7 illustrates a method to detect a terminal group. Here, it is assumed that the network exploration apparatus 10 transmits exploration packets to the terminals N1 to N6 by multicast or broadcast. At this time, the exploration packets basically reach all of the terminals N1 to N6. Note that, packets transmitted through a network may be discarded, for example, when the network is congested. In other words, packet loss of exploration packets transmitted from the network exploration apparatus 10 to the terminals N1 to N6 may be caused over the network.

Figure 7A:
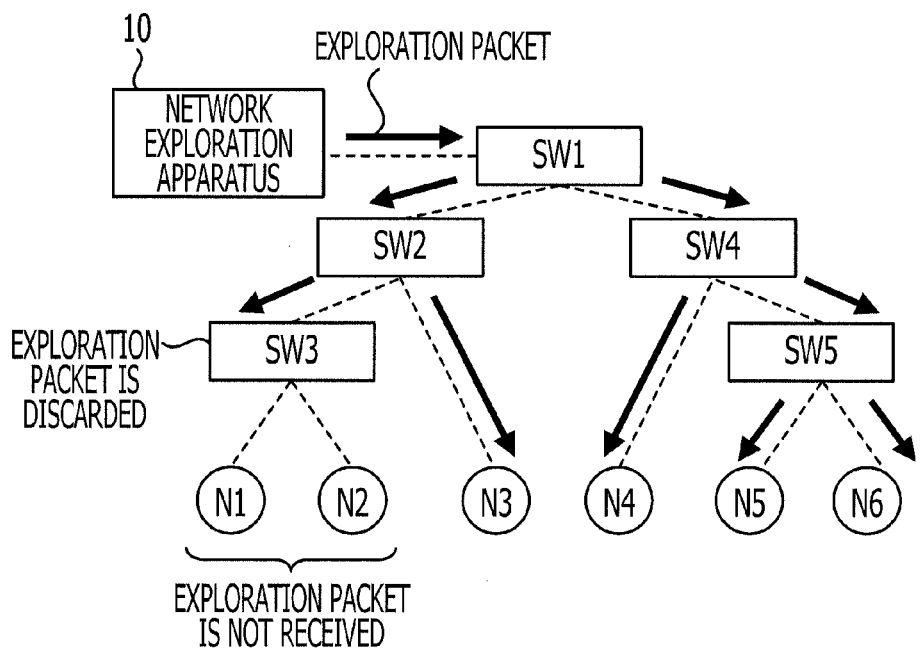
FIG. 7A illustrates a method to detect a terminal group.

In the example of FIG. 7(a), congestion is caused at the switching hub SW3, and the exploration packet is discarded at the switching hub SW3. In this case, exploration packets transmitted from the network exploration apparatus 10 reach the terminals N3 to N6, however do not reach the terminals N1 to N2. The exploration packets according to the embodiment are transmitted by a protocol without a retransmission function. Accordingly, when a packet loss is caused at the switching hub SW3, the terminals N1 to N2 do not receive the above described exploration packets.

When the terminals N3 to N6 receive the exploration packets, the terminals N3 to N6 create corresponding response packets and return the response packets to the network exploration apparatus 10 respectively. At this time, the response packets are transmitted by a protocol with a retransmission function. Hence, the response packets transmitted from the terminals N3 to N6 surely reach the network exploration apparatus 10 even if the subnetwork 2 is congested. In other words, the network exploration apparatus 10 receives the response packets from the terminals N3 to N6.

Meanwhile, the terminals N1 and N2 in the example do not receive exploration packets; thereby neither of the terminals N1 to N2 transmits a response packet. Accordingly, the network exploration apparatus 10 does not receive any response packet from the terminals N1 and N2.

The detector 13 of the network exploration apparatus 10 groups the terminals N1 and N2 if the detector 13 may not receive response packets from the terminals N1 and N2 within a certain time period. In other words, a terminal group, "N1, N2" is detected.

As described above, a terminal that receives an exploration packet returns a response packet to the network exploration apparatus 10. The response packet transmitted by the terminal surely reaches the network exploration apparatus 10 as described above. Accordingly, a cause that the network exploration apparatus 10 may not receive the response packets from the terminals N1 and N2 is considered that the exploration packets do not reach the terminals N1 and N2.

In other words, terminals other than a transmission source terminal of the response packet do not receive the exploration packets and the terminal N1 and N2 are grouped as "terminals that may not receive exploration packets." Moreover, a cause that exploration packets do not reach the terminal N1 and N2 is that the exploration packets may be discarded at a network device (according to the embodiment, a switching hub SW3) related to both the terminals N1 and N2.

Hence, the terminal group detected as described above may be used as information that indicates a network topology. For example, when the terminal group, "N1, N2" is detected, the terminals N1 and N2 are coupled to the same switching hub, or the terminals N1 and N2 are coupled to the same switching hub viewed from the network exploration apparatus 10. In the example of FIG. 7A, both the terminals N1 and N2 are coupled to the switching hub SW3.

Figure 7B:
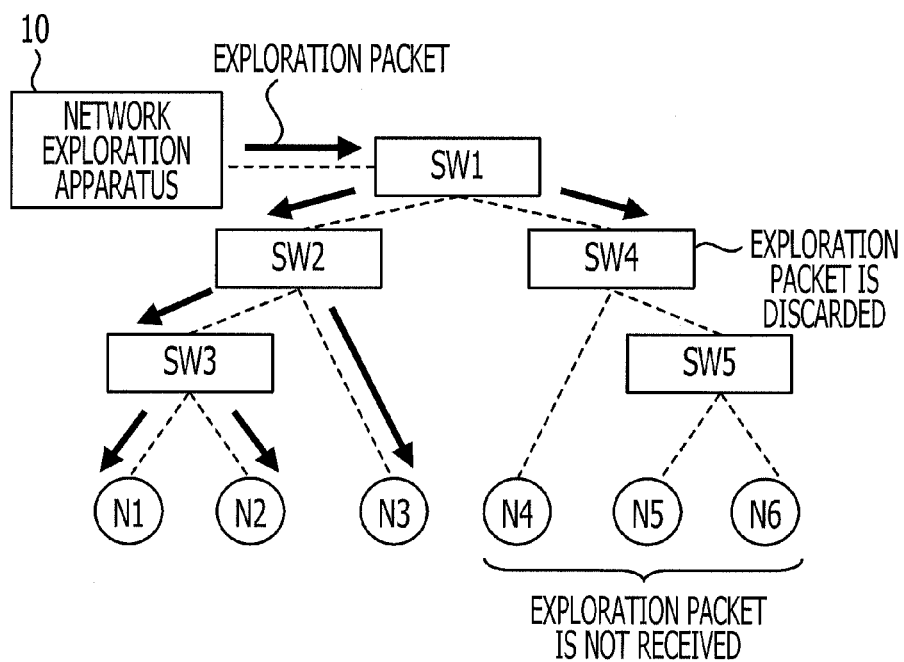
FIG. 7B illustrates a method to detect a terminal group.

In the example of FIG. 7B, congestion is caused at the switching hub SW4 and exploration packets are discarded at the switching hub SW4. In this case, exploration packets transmitted from the network exploration apparatus 10 reach the terminals N1 to N3; however do not reach the terminals N4 to N6.

In this case, the network exploration apparatus 10 receives response packets from the terminals N1 to N3, however do not receive response packets from the terminals N4 to N6. The detector 13 groups the terminals N4, N5, and N6. In other words, a terminal group "N4, N5, and N6" is detected.

When the terminal group "N4, N5, and N6" is detected, the exploration packets are considered to be discarded with a high possibility at a network device (according to the embodiment, the switching hub SW4) that is commonly related to in the terminals N4, N5, and N6. In this case, the terminals N4, N5, and N6 are coupled to the same switching hub, or the terminals N4, N5, and N6 are coupled to the same switching hub viewed from the network exploration apparatus 10. In the example of FIG. 7B, all of the terminals N4, N5, and N6 are coupled to the switching hub SW4 viewed from the network exploration apparatus 10.

The network exploration apparatus 10 repeatedly executes the above-described exploration. The "exploration" corresponds to a procedure that transmits exploration packets to all terminals coupled to the subnetwork 2 and monitors the responses. The detector 13 detects a plurality of terminal groups according to whether a response packet for each exploration may be received from each terminal. The terminal groups detected by the detector 13 are notified to the calculator 14.

The calculator 14 calculates a communication cost between terminals based on an inclusion relationship among the plurality of terminal groups detected by the detector 13. The calculator 14 calculates the communication cost between terminals while updating and referring to a group information list 17.

FIG. 8 is an embodiment of the group information list 17. A terminal group detected by the detector 13 is registered in the group information list 17. In the example of FIG. 8, the following six terminal groups are registered in the group information list 17. The six groups are "N1, N2", "N4, N5, N6", "N1, N2, N3", "N5, N6", "N1, N2, N3, N4, N5, N6", and "N1, N2, N5, N6." For example, the terminal group, "N1, N2" is registered when the network exploration apparatus 10 may not receive the response packets from the terminals N1 and N2. For example, the terminal group, "N4, N5, N6" is registered when the network exploration apparatus 10 may not receive response packets from the terminals N4, N5, and N6.

Moreover, the group information list 17 manages a detection frequency of each terminal group (a frequency counter in FIG. 8). The detection frequency in the example indicates the number of times a terminal group is detected by the detector 13. In other words, the calculator 14 counts up a frequency counter of a terminal group when the detector 13 detects the terminal group. In the example of FIG. 8, for example, the terminal group, "N1, N2" is detected at 15 times and the terminal group, "N4, N6" is detected at 12 times. Furthermore, the calculator 14 sorts terminal groups registered in the group information list 17 according to the detection frequencies.

Figure 9:
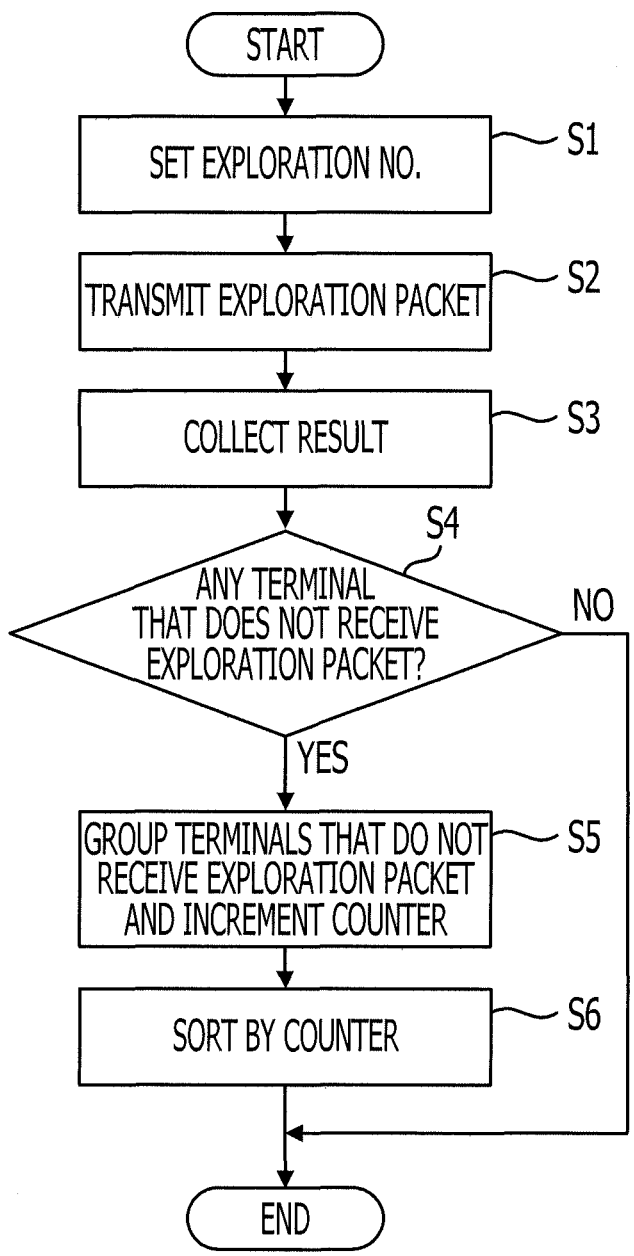
FIG. 9 is a flow chart illustrating processing to create a group information list.

FIG. 9 is a flow chart illustrating processing to create the group information list 17. The processing is executed by the transmitter 11, the receiver 12, the detector 13, and the calculator 14. The execution of processing is, for example, repeated periodically.

The detector 13 sets an exploration number at operation S1. The exploration number is, for example, a sequence number and different values are used for respective explorations. As described above, the "exploration" corresponds to a procedure to transmit exploration packets to all terminals coupled to the subnetwork 2 and detects the responses. The detector 13 notifies an exploration number to the transmitter 11 and the receiver 12. In the example, the detector 13 generates exploration numbers; however other circuit components may generate exploration numbers.

At operation S2, the transmitter 11 creates exploration packets and transmits the exploration packets to all terminals coupled to the subnetwork 2. At this time, the exploration number notified by the detector 13 is set in the exploration packet. Moreover, the exploration packets are transmitted by multicast or broadcast.

At operation S3, the receiver 12 and the detector 13 collect exploration results. In other words, the receiver 12 waits for a response packet in which an exploration number notified by the detector 13 is set until a certain time period elapses from when the transmitter 11 transmits the exploration packets. The detector 13 compares a transmission source terminal of each response packet received by the receiver 12 with terminals registered in the terminal list 16. It is considered that the transmission source terminal of the response packet receives the exploration packet while other terminals do not receive exploration packets. In other words, a terminal that does not receive an exploration packet is detected.

At operation S4, the detector 13 determines whether there is any terminal that does not receive an exploration packet based on a reception state of the response packets. If there is any terminal that does not receive an exploration packet, the processing proceeds to operation S5. When the receiver 12 receives response packets from all of the terminals, the processing is completed.

At operation S5, the detector 13 groups terminals that do not receive exploration packets. The calculator 14 increments a frequency counter (counts up a count value for 1) of the terminal group detected by the detector 13 in the group information list 17. The calculator 14 sorts the updated group information list 17 according to the value of the frequency counter.

Accordingly, the network exploration apparatus 10 creates the group information list 17 by repeatedly executing processing of the flow chart in FIG. 9. The processing of operations S5 to S6 are executed basically when an exploration packet transmitted by the network exploration apparatus 10 is discarded at any of the switching hubs in the subnetwork 2. In other words, the group information list 17 is updated basically when an exploration packet is discarded.

The calculator 14 executes aggregation of terminal groups by using the group information list 17 created as described above. The aggregation of the terminal groups corresponds to processing to detect a topology of a network to be explored.

Figure 10:
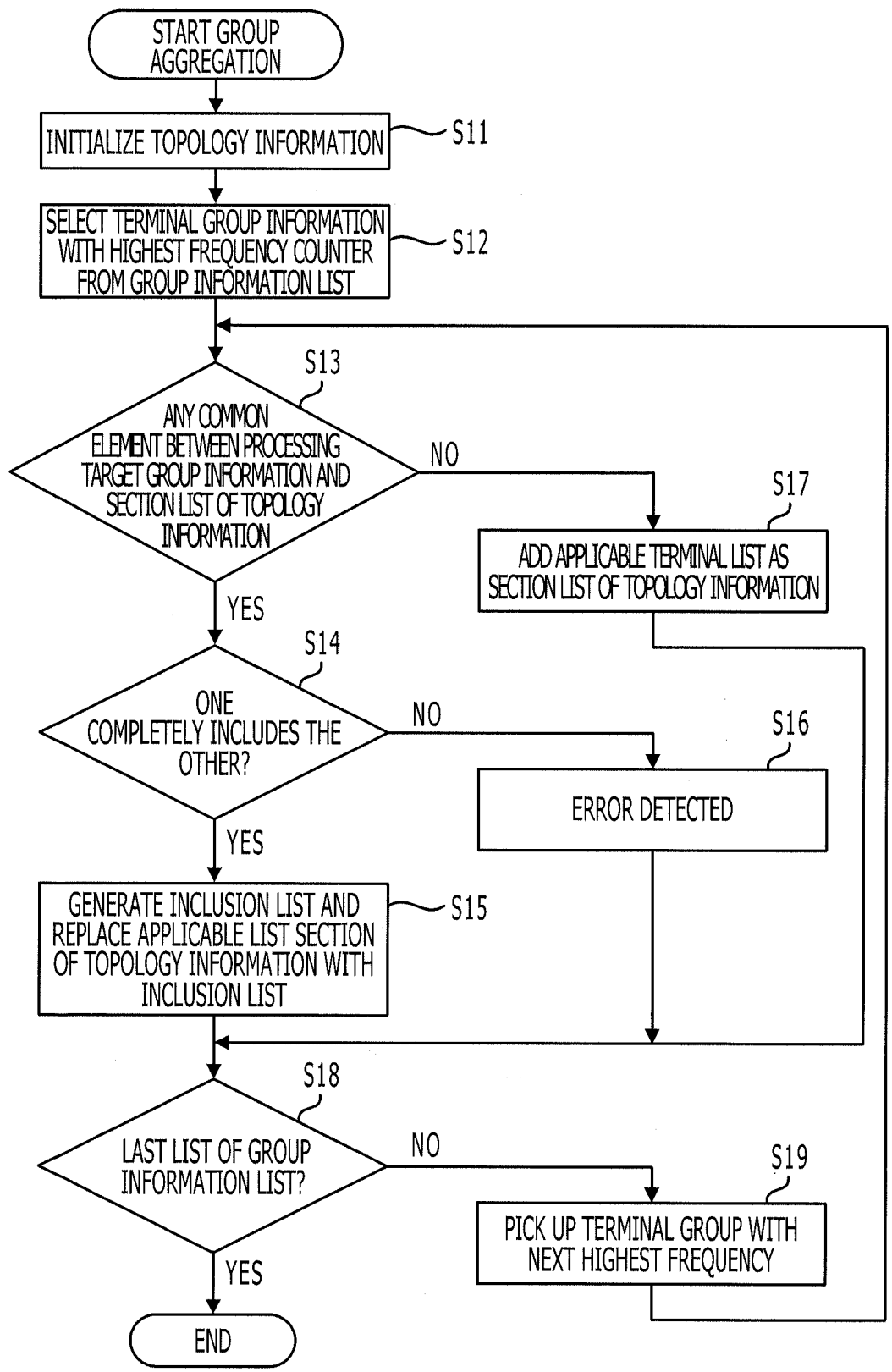
FIG. 10 is a flow chart illustrating processing to aggregate terminal groups.

FIG. 10 is a flow chart illustrating processing to aggregate terminal groups. The processing of the flow chart is executed, for example, by the calculator 14 after the group information list 17 is created.

At operation S11, the calculator 14 initializes topology information. The topology information is created in a certain memory area (not illustrated) in the network exploration apparatus 10.

At operation S12, the calculator 14 selects a terminal group with substantially the largest frequency counter value in the group information list 17. It is assumed that terminal groups are sorted according to values of the frequency counters in the group information list 17.

At operation S13, the calculator 14 determines whether there is any common element between processing target group information and the topology information. The processing target group information indicates one or a plurality of terminal groups that belongs to the terminal group selected at operations S12 or S19. The topology information indicates a relationship between terminals and will be described later by referring to an embodiment. The topology information does not include any element at operation S11 when the topology information is initialized. Moreover, the topology information is updated at Operation S14 or Operation S16. If there is any common element (in other words, a terminal ID) between the processing target group information and the topology information, the processing proceeds to operation S14, and otherwise the processing proceeds to operation S17.

At operation S14, the calculator 14 detects whether there is any inclusion relationship between processing target group information and each section list in the topology information. Here, each section list will be described later by referring to an embodiment, and includes one or more terminal IDs. For example, processing target group information is "N1, N2" and a section list in the topology information is "(N1, N2, and N3)". In this case, the section list is determined to include the processing target group information. Moreover, processing target group information is "N1, N2" and a section list in the topology information is "(N2, and N3)". In this case, "N1" that belongs to the processing target group information is not an element of the section list and "N3" that belongs to the section list is not an element of the processing target group information. Thus, it is determined that there is no inclusion relationship between the processing target group information and the topology information.

If there is any inclusion relationship between the processing target group information and the section list in the topology information (operation S14: Yes), the calculator 14 updates the topology information at operation S15. At this time, the section list having the inclusion relationship with the processing target group information is replaced with an inclusion list that indicates the inclusion relationship between the processing target group information and the topology information.

If there is no inclusion relationship between the processing target group information and the section list in the topology information (operation S14: No), the calculator 14 determines that the processing target group information includes an error at step 16. In this case, the processing of operation S15 is skipped. Moreover, the processing target group information is discarded.

If there is no common element between the processing target group information and the topology information (operation S13: No), the calculator 14 adds a terminal list represented by the processing target group information to the topology information as a new section list at operation S17. In this case, the processing of operation S15 is also skipped.

At operations S18 and S19, the calculator 14 checks whether all of the terminal groups registered in the group information list 17 are selected. If there is any unselected terminal group in the group information list 17, the calculator 14 selects the next terminal group and returns to operation S13. In other words, the calculator 14 sequentially selects terminal groups one by one from the group information list 17 according to the frequency counters and executes processing of operations S13 to S19 respectively. Accordingly, the terminal groups are aggregated and the topology information is generated.

Now, processing to aggregate terminal groups in FIG. 10 is described. Here, the group information list 17 in FIG. 8 is assumed to be already created.

A terminal group with substantially the largest frequency counter value is selected from the group information list 17 in FIG. 8. In other words, the terminal group, "N1, N2" is selected. At this time, no common element is present between the processing target group information and the topology information because the topology information is initialized, and thereby operation S13 is determined to be "No." Therefore, at operation S17, the terminal group, "N1, N2" is added to the topology information as one section list. As a result, the topology information is updated as follows: topology information 1=(N1, N2).

Note that topology information "i" (i=1, 2, 3, . . . ) represents topology information when aggregation processing for "i" th terminal group is executed. The parenthesis in the notation of the topology information indicates a terminal group. In other words, the plurality of terminals in one parenthesis indicates that the terminals belong to the same terminal group.

The terminal group with the second highest frequency is selected. In other words, the terminal group, "N4, N5, N6" is selected. No common element is present between the selected terminal group "N4, N5, N6" and the topology information 1 "(N1, N2)." In this case, it is determined that the terminals that belong to the processing target group information and the terminals that belong to the topology information 1 are assumed to be arranged in parallel. At operation S17, the terminal group, "N4, N5, N6" is added to the topology information as a new section list. As a result, the topology information is updated as follows: topology information 2=(N1, N2) (N4, N5, N6). Terminals in different parentheses in the notation of the topology information belong to different groups.

The third terminal group, "N1, N2, N3" is selected. There are common elements between the selected terminal group, "N1, N2, N3" and the topology information 2 "(N1, N2) (N4, N5, N6)." Moreover, an inclusion relationship is present between the selected terminal group, "N1, N2, N3" and a section list of the topology information 2 "(N1, N2)." In other words, each of the elements in the section list "(N1, N2)" is included in the elements of the terminal group "N1, N2, N3." Hence, in this case, an inclusion list "((N1, N2), N3)" that indicates the inclusion relationship is created at operation S15. Furthermore, the section list "(N1, N2)" having an inclusion relationship with the processing target group information is replaced with the inclusion list "((N1, N2), N3)" that indicates the inclusion relationship between the processing target group information and the topology information. As a result, the topology information is updated as follows:

Topology information 3=((N1, N2) N3) (N4, N5, N6)

In notations of topology information and an inclusion list, the multiple parentheses indicate the terminal groups have a parent and child relationship. For example, "((N1, N2) N3)" indicates a child terminal group "N1, N2" is present in the terminal group, "(N1, N2) N3."

The fourth terminal group "N5, N6" is selected. Here, common elements are present between the selected terminal group, "N5, N6" and the topology information 3, ((N1, N2) N3) (N4, N5, N6). Moreover, an inclusion relationship is present between the selected terminal group, "N5, N6" and a section list of the topology information 3 "(N4, N5, N6)." In other words, each of the elements in the section list "(N5, N6)" is included in the elements of the section list "(N4, N5, N6)." Therefore, the inclusion list (N4, (N5, N6)) that indicates the inclusion relationship is created at operation S15. The section list "(N4, N5, N6)" of the topology information 3 is replaced with the inclusion list, "(N4, (N5, N6))." As a result, the topology information is updated as follows:

Topology information 4=((N1, N2) N3) (N4 (N5, N6))

When the fifth terminal group, "N1, N2, N3, N4, N5, N6" is selected, the topology information is updated in the same manner as follows:

Topology information 5=((N1, N2) N3) (N4 (N5, N6))

Moreover, the sixth terminal group, "N1, N2, N5, N6" is selected. Common elements are present between the selected terminal group, "N1, N2, N5, N6" and the topology information 5 "((N1, N2) N3) (N4 (N5, N6))." However, no inclusion relationship is present between the selected terminal group, "N1, N2, N5, N6" and each of the section lists of the topology information 5. The topology information 5 includes the section list 1 "(((N1, N2) N3))", and the section list 2 "(N4 (N5, N6))."

However, "N3" that belongs to the section list 1 does not belong to the above-described terminal group, and N5 and N6 that belong to the above-described terminal list do not belong to the section list 1. In other words, no inclusion relationship is present between the sixth terminal list and the section list 1. Likewise, no inclusion relationship is present between the sixth terminal list and the section list 2. Accordingly, operation S14 determined to be "No". At operation S16, an error is detected.

When operations S13 to S17 are executed for all of the terminal groups registered in the group information list 17 as described above, the calculator 14 outputs the created topology information. In the above example, the calculator 14 outputs the topology information 5.

As described above, the calculator 14 creates and outputs topology information by executing operations S13 to S17 for each terminal group registered in the group information list 17. However, topology information may be created by executing operations S13 to S17 for some of the terminal groups registered in the group information list 17.

For example, operations S13 to S17 may be executed for a terminal group the frequency counter value of which exceeds a certain threshold. In this case, the threshold may be determined, for example, by the number of terminals coupled to a network to be explored, and/or the number of times to execute explorations. In the example of FIG. 8, the threshold is assumed to be "6", for example. Processing of operations S13 to S17 is executed for the top 4 terminal groups and the above-described topology information 4 is output.

Alternatively, the calculator 14 may end the aggregation processing of the terminal groups if operation S14 is determined to be "No" and an error is detected. In other words, aggregation processing of the terminal groups may be ended if any contradiction is caused in the inclusion relationship between previously selected terminal groups and a newly selected terminal group.

A case is described in which an inclusion relationship between terminal groups contradicts and an error is detected at operation S16. It is assumed as an example that two terminal groups "N1, N2" and "N2, N3" are detected and registered in the group information list 17. The terminal group "N1, N2" is detected when "the terminal N3 receives an exploration packet, however the terminals N1 and N2 do not receive exploration packets." In other words, the terminal group "N1, N2" is detected, for example, when a loss of an exploration packet is caused at a switching hub SW-X in a network topology illustrated in FIG. 11A.

Figure 11A:
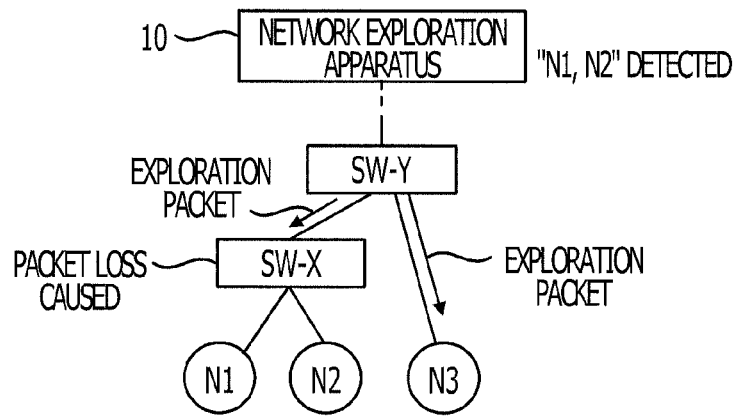
FIG. 11A illustrates a case when an inclusion relationship among terminal groups contradicts.
Figure 11B:
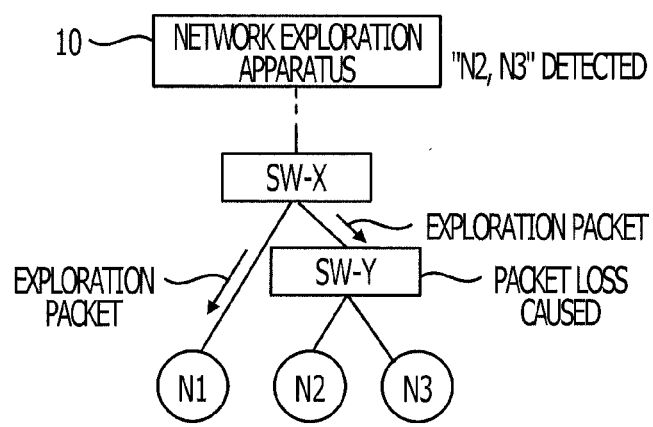
FIG. 11B illustrates a case when an inclusion relationship among terminal groups contradicts.

Meanwhile, the terminal group "N2, N3" is detected when "the terminal N1 receives an exploration packet, however, the terminals N2 and N3 do not receive exploration packets." In other words, the terminal group "N2, N3" is detected, for example, when a loss of an exploration packet is caused at a switching hub SW-Y in a network topology illustrated in FIG. 11B.

As described above, when terminal groups "N1, N2" and "N2, N3" that contradict each other are detected, different network topologies are estimated as in FIGS. 11A and 11B. In other words, when terminal groups that contradict each other are detected, the network topology may not be estimated. Thus, the network exploration method according to the embodiment estimates a network topology based on a terminal group with a higher detection frequency when terminal groups that contradict each other are detected.

For example, processing of the flow chart in FIG. 10 is executed for terminal groups in order of a terminal group with a greater frequency counter value. If an inclusion relationship between the previously selected terminal group and newly selected terminal group contradicts, group information of the newly selected terminal group is ignored in the flow chart in FIG. 10.

Figure 11C:
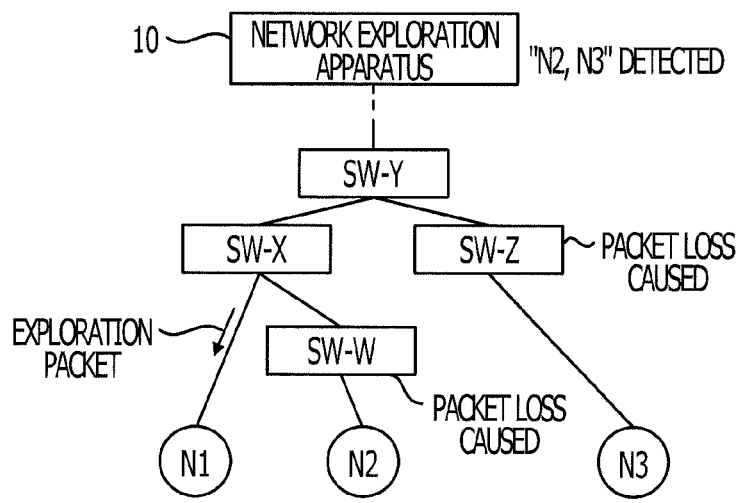
FIG. 11C illustrates a case when an inclusion relationship among terminal groups contradicts.

For example, a network topology in FIG. 11A is estimated when the detection frequency of the terminal group "N1, N2" is higher than that of the terminal group "N2, N3." A state that the terminal group "N2, N3" is detected in the network topology illustrated in FIG. 11A is when packet losses are caused at two points as illustrated in FIG. 11C. In other words, the terminal group "N2, N3" is detected when a packet loss of an exploration packet is caused at a switching hub SW-W provided between the switching hub SW-X and the terminal N2, and a packet loss of an exploration packet is caused at a switching hub SW-Z provided between the switching hub SW-Y and the terminal N3 as well.

However, a probability of causing packet losses at two points at substantially the same time at one exploration is very low. In other words, for example, in the network topology in FIG. 1A, a frequency to detect the terminal group "N2, N3" is very low. Hence, estimating an inappropriate network topology at aggregating processing of terminal groups may be avoided by not using a terminal group with a frequency counter value lower than a certain threshold.

The calculator 14 calculates a communication cost between terminals coupled to a network to be explored based on the topology information created as described above. According to the embodiment, the topology information is converted into the communication cost table.

Figure 12:
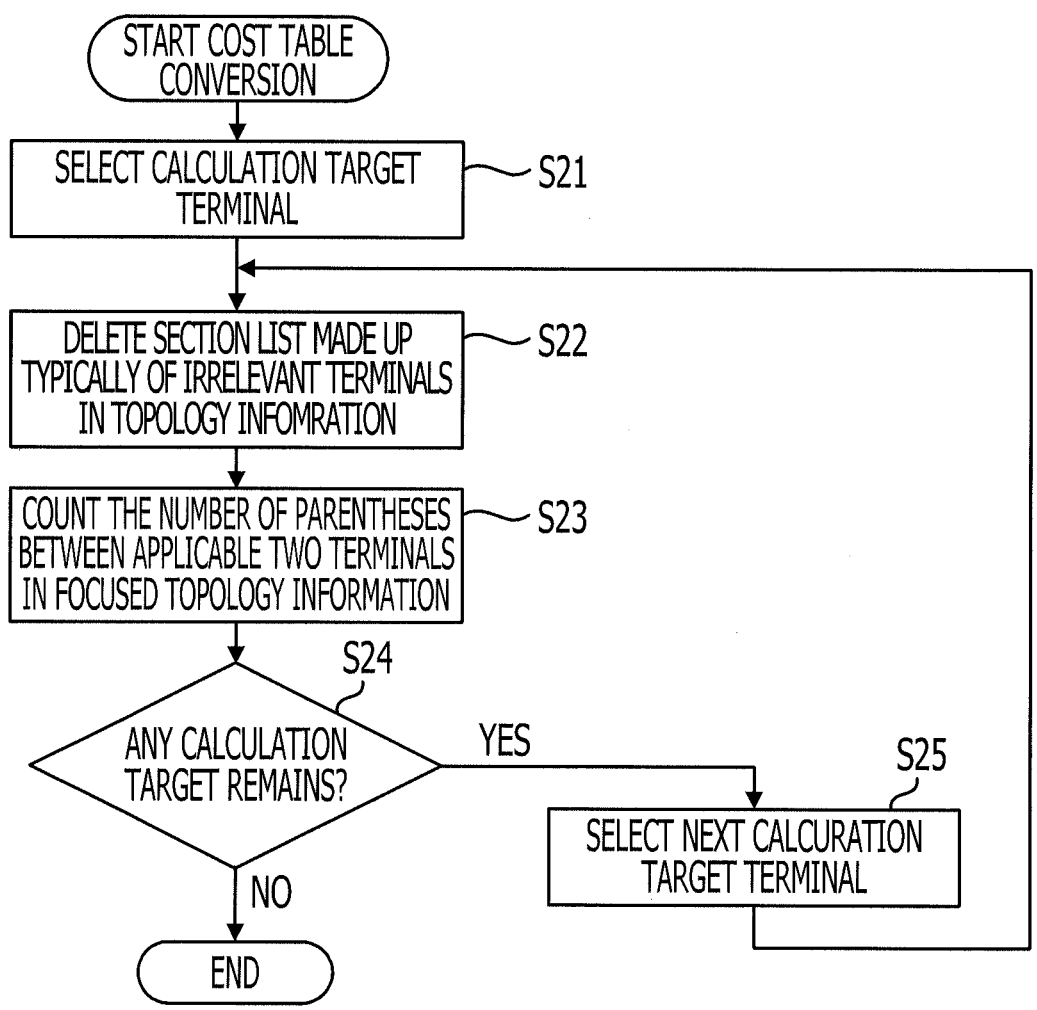
FIG. 12 is a flow chart illustrating processing to calculate a communication cost.

FIG. 12 is a flow chart illustrating processing to calculate a communication cost. The processing in the flow chart is executed, for example, when a reference terminal is specified. The reference terminal is not specifically limited to but, for example, a terminal newly coupled to a network to be explored. In other words, for example, terminals N1 to N5 form a P2P network, and when a terminal N6 is newly coupled to the P2P network, the terminal 6 is a reference terminal. In this case, the network exploration apparatus 10 calculates communication costs from the terminal N6 to other terminals N1 to N5 respectively in response to an inquiry from the terminal N6.

At operation S21, the calculator 14 selects a calculation target terminal among a plurality of terminals coupled to the network. The calculation target terminal is, for example, a terminal registered in the terminal list 16 and is selected from terminals other than the reference terminal.

At operation S22, the calculator 14 deletes a section list that does include neither the reference terminal nor the calculation target terminal from the topology information. Accordingly, focused topology information is obtained. The focused topology information is a substantially minimum network topology that includes a reference terminal and a calculation target terminal.

At operation S23, the calculator 14 calculates the number of parentheses that separates a reference terminal and a calculation target terminal in the focused topology information obtained at operation S22. The number of parentheses is output as a communication cost between the reference terminal and the calculation target terminal.

At operations S24 and S25, the calculator 14 searches a terminal that is not selected as a calculation target terminal. If there are terminals that are not selected as a calculation target terminal, the next calculation target terminal is selected from the unselected terminals and processing returns to operation S22. In other words, operations S22 and S23 are executed for each terminal. As a result, a communication cost between the reference terminal and other respective terminals is calculated.

A method to calculate a communication cost according to an embodiment will be described. In the description below, it is assumed that the topology information=((N1, N2) N3) (N4 (N5, N6)) is obtained by executing the processing in the flow chart in FIG. 10. The topology information includes the following four section lists: (N1, N2), (N1, N2, N3), (N5, N6), and (N4, N5, N6).

Here, it is assumed that reference terminal=N6. Accordingly, a communication cost is calculated as below.

When a calculation target terminal=N5, ((N1, N2) N3) is deleted from the topology information, and focused topology information (N4 (N5, N6)) is generated. The number of parentheses that separates "N6" and "N5" is calculated. In this case, "N6" and "N5" are in the same parenthesis. Thus, the communication cost from the terminal N6 to the terminal N5 is "0."

When a calculation target terminal=N4, focused topology information, "(N4 (N5, N6))" is generated as well. Note that "N4" is outside of the "(N5, N6)." In other words, "N6" and "N4" are separated by one parenthesis each other. Thus, the communication cost from the terminal N6 to the terminal N4 is "1."

When a calculation target terminal=N3, focused topology information "((N1, N2) N3) (N4 (N5, N6))" is generated. In order to reach from N6 to N3, the following three parentheses are needs to be passed. The three parentheses are a parenthesis "a": (N5, N6), a parenthesis "b": (N4, N5, N6), and a parenthesis "c": (N1, N2, N3). In other words, in order to reach from N6 to N3, moving from the inside of the parenthesis "a" to the outside, from the inside the parenthesis "b" to the outside and from the outside of the parenthesis "c" to the inside is required. In other words, N6 and N3 are separated by three parentheses. Thus, a communication cost from the terminal N6 to the terminal N3 is "3."

When a calculation target terminal=N2, focused topology information "((N1, N2) N3) (N4 (N5, N6))" is generated. In order to reach from N6 to N2, the following four parentheses are present therebetween. The four parentheses are a parenthesis "a": (N5, N6), a parenthesis "b": (N4, N5, N6), a parenthesis "c": (N1, N2, N3), and a parenthesis "d": (N1, N2). In other words, N6 and N2 are separated by the four parentheses. Thus, a communication cost from the terminal N6 to the terminal N2 is "4." Likewise, a communication cost from the terminal N6 to the terminal N1 is "4" as well.

A communication cost table 18 is created through the above calculation. FIG. 13 illustrates an embodiment of the communication cost table 18 when the terminal N6 is a reference terminal. A cost corresponding to the switching hub SW1 is not counted according to the embodiment. Note that in the above calculation, a cost corresponding to the switching hub SW1 is substantially eliminated for each of the terminals, and thereby causing no problem when relative communication costs are compared. Moreover, when a terminal is added that is directly connected to the switching hub SW1, the presence of the switching hub SW1 is recognized or estimated by further repeating explorations, and the cost corresponding to the switching hub SW1 is reflected to the calculation result.

When the communication cost table 18 in which the reference terminal is the terminal N6 is created as described above, the network exploration apparatus 10 notifies the terminal N6 of a partner terminal with substantially the lowest communication cost from the terminal 6. In the example of FIG. 13, the network exploration apparatus 10 notifies the terminal N6 of "N5." The terminal N6 requests the terminal N5 to set the terminal N6 as a transfer destination of P2P communication data. The terminal N5 that receives the request transfers P2P communication data received from other terminal (here, one of the terminals N1 to N4) to the terminal N6. As a result, the P2P data distribution is achieved by a route with a lower communication cost and thereby improving communication efficiency among terminals.

The network exploration apparatus 10 may select a terminal with a lower probability of causing a loss of an exploration packet as a communication partner of P2P communication when communication costs of two or more terminals are substantially the same. Moreover, the network exploration apparatus 10 may calculate a communication cost by assuming a terminal other than a newly added terminal as a reference terminal. In other words, the network exploration apparatus 10 may calculate a communication cost by assuming any terminal as a reference.

The network exploration apparatus 10 executes, for example, periodic explorations repeatedly and updates the group information list 17. In this case, the number of times causing a packet loss increases as time elapses and thereby improving reliability of exploration results.

The network exploration method according to the embodiment utilizes that a loss of an exploration packet is caused at a switching hub, etc. Thus, the network exploration method according to the embodiment may be executed when regular P2P data communication is conducted between terminals. In this case, a probability of causing a loss of an exploration packet due to congestion by regular P2P data communication becomes high. As a result, the number of samples to create the group information list 17 increases, thereby increasing reliability of the exploration. Alternatively, time desired to create the group information list 17 is reduced.

Moreover, the network exploration apparatus 10 may transmit a dummy packet in addition to an exploration packet when executing an exploration in order to increase a probability of causing a loss of the exploration packet. In this case, the exploration packet and the dummy packet are transmitted, for example, by time division multiplexing.

Another Embodiment

A network exploration apparatus 10 is provided in an embodiment illustrated in FIG. 3 in order to calculate a communication cost. On the other hand, according to another embodiment, any terminal in a plurality of terminals coupled to a network to be explored calculates a communication cost between terminals as a network exploration apparatus.

Figure 14:
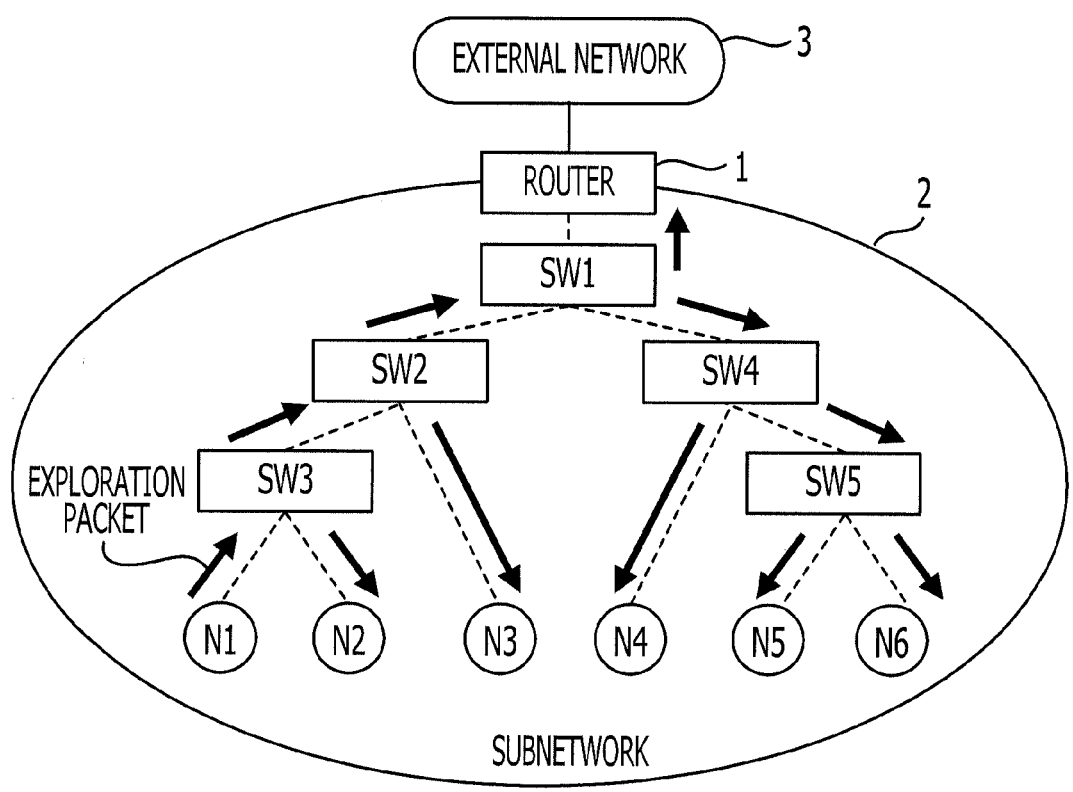
FIG. 14 is an example of a network configuration in which a network exploration method according to another embodiment is used.

FIG. 14 illustrates a configuration example of a network in which a network exploration method according to the other embodiment is used. Here, a terminal N1 among terminals N1 to N6 has a function to calculate a communication cost. In this case, the terminal N1 includes a transmitter 11, a receiver 12, a detector 13, a calculator 14, a temporary list 15, a terminal list 16, a group information list 17, and a communication cost table 18. Two or more terminals among the terminals N1 to N6 may have a communication cost calculation function or each terminal may have a communication cost calculation function.

In a system illustrated in FIG. 14, procedures in which the terminal N1 creates the group information list 17 and calculates a communication cost between terminals are basically the same as the procedure in FIG. 3 executed by the network exploration apparatus 10. FIG. 15 illustrates an example of a communication cost table 18 created by the terminal N1.

The terminal N1 may periodically execute the above described exploration and update the group information list 17 and the communication cost table 18. According to the configuration, the terminal N1 may perform P2P data distribution by almost always using a partner terminal with a lower communication cost. For example, it is assumed that the terminal N3 is specified as a partner terminal of P2P communication of the terminal N1.

After that the communication cost table 18 illustrated in FIG. 15 is assumed to be obtained. In the example of FIG. 15, a communication cost from the terminal N1 to the terminal N2 is lower than that of from the terminal N1 to the terminal N3. Thus, in this case, the terminal N1 refers to the communication cost table 18 and switches a partner terminal of P2P communication from the terminal N3 to the terminal N2. Accordingly, efficiency to transfer P2P communication data are improved. Note that the above-described state may be caused, for example, when the terminal N2 is newly coupled to the switching hub SW3.

Hardware Configuration

Figure 16:
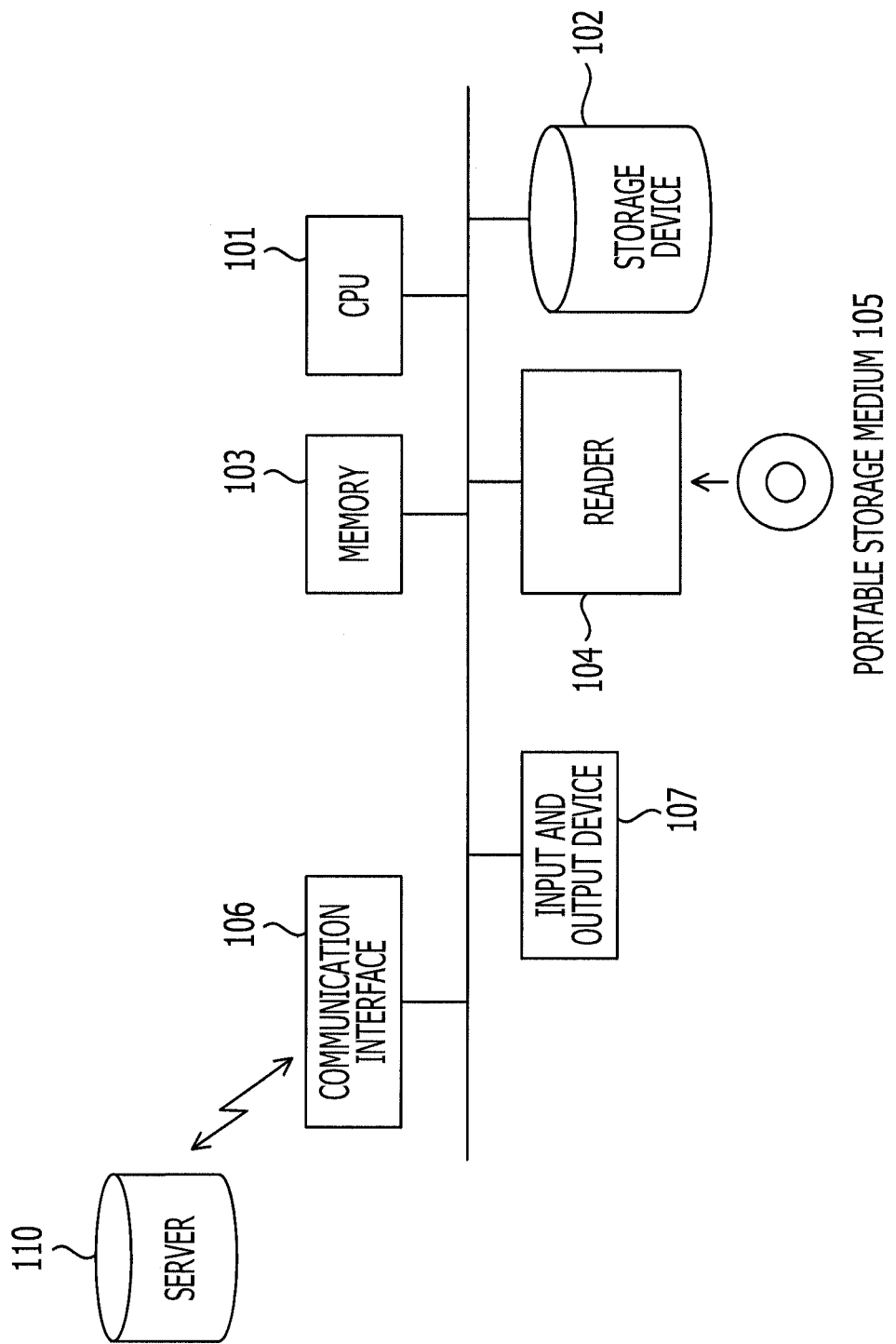
FIG. 16 illustrates a hardware configuration of a network exploration apparatus.

FIG. 16 illustrates a hardware configuration of the network exploration apparatus 10. The terminal device to execute the network exploration method according to an embodiment basically also includes a configuration illustrated in FIG. 16.

In FIG. 16, a CPU 101 provides a network exploration method according to an embodiment by executing a network exploration program using a memory 103. A storage device 102 stores the network exploration program. The storage device 102 may be an external storage device. The memory 103 is, for example, a semiconductor memory and includes a Random Access Memory (RAM) area and a Read-only Memory (ROM) area. As described above, the network exploration apparatus according to an embodiment is achieved by a computer that includes a CPU and a memory.

A reader 104 accesses a portable storage medium 105 according to an instruction from the CPU 101. The portable storage medium 105 includes, for example, a semiconductor device, a medium to and from which information is input and output by magnetic action, or by optical action. A communication interface 106 transmits and receives data through a network according to an instruction from the CPU 101. An input and output device 107 corresponds to, for example, a device etc. that accepts an instruction from a user.

The network exploration program according to an embodiment describes the procedure of the above-described flow chart, and for example, provided by the following forms: (1) installed in the storage device 102, (2) provided by the portable storage medium 105, and (3) download from a program server 110.

The network exploration apparatus according to an embodiment is achieved by executing the network exploration program by the computer system configured as described above. In other words, executing the network exploration program by the computer system configured as described above may achieve some of or all of the transmitter 11, the receiver 12, the detector 13, and the calculator 14. Moreover, the temporary list 15, the terminal list 16, the group information list 17, and the communication cost table 18 are created, for example, in the memory 103.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions has been described in detail, it should be understood that the various changes, substitutions, and alterations could be made hereto without departing from the spirit and scope of the invention.

What is claimed is:

1. A network exploration apparatus configured to calculate a communication cost of a network to which a plurality of terminals is coupled through a plurality of network devices, the network exploration apparatus comprising:
   a transmitter configured to transmit an exploration packet to the plurality of terminals;
   a receiver configured to receive a response packet for the exploration packet;
   a detector configured to detect a terminal group to which a terminal that does not receive the exploration packet among the plurality of terminals belongs based on a reception result of the response packet by the receiver; and
   a calculator configured to calculate a communication cost between terminals based on an inclusion relationship between a plurality of terminal groups detected by the detector when the transmitter repeatedly transmits the exploration packet,
   wherein the inclusion relationship is present between a detected terminal group and a section list of topology information when each of terminals in the section list is included in the terminals of the terminal group.

2. The network exploration apparatus according to claim 1, further comprising:
   a group information list configured to record a detection frequency of each of the plurality of terminal groups; and
   the calculator calculates a communication cost between terminals by using an inclusion relationship between two or more terminal groups extracted in order of the terminal groups with higher detection frequencies.

3. The network exploration apparatus according to claim 2, wherein the calculator calculates a communication cost between terminals by using an inclusion relationship between terminal groups with a detection frequency higher than a certain threshold.

4. The network exploration apparatus according to claim 1, wherein the calculator generates topology information representing a topology of the network based on an inclusion relationship of the plurality of terminal groups, and calculates a communication cost between terminals based on the topology information.

5. The network exploration apparatus according to claim 1, wherein the transmitter transmits the exploration packet to the plurality of terminals by multicast or broadcast.

6. The network exploration apparatus according to claim 1, wherein the transmitter transmits the exploration packet by a protocol without a transmission function, and the receiver receives the response packet by a protocol with a transmission function.

7. The network exploration apparatus according to claim 1, wherein the transmitter transmits a dummy packet in parallel with the exploration packet.

8. A network exploration method executed by a network exploration apparatus in a network to which a plurality of terminals is coupled through a plurality of network devices, the network exploration method comprising:
    transmitting an exploration packet to the plurality of terminals;
    receiving a response packet for the exploration packet;
    detecting a terminal group to which a terminal that does not receive the exploration packet among the plurality of terminals belongs based on a reception result of the response packet; and
    calculating a communication cost between terminals based on an inclusion relationship between a plurality of terminal groups detected when the exploration packet is repeatedly transmitted,
    wherein the inclusion relationship is present between a detected terminal group and a section list of topology information when each of terminals in the section list is included in the terminals of the terminal group.

9. The network exploration method according to claim 8, wherein the network exploration apparatus is achieved by any terminal among the plurality of terminals.

* * * * *